(12) United States Patent
Hou et al.

(10) Patent No.: US 8,790,486 B2
(45) Date of Patent: *Jul. 29, 2014

(54) WELDING TECHNIQUES FOR POLYMER OR POLYMER COMPOSITE COMPONENTS

(75) Inventors: Meng Hou, Telopea (AU); Andrew Beehag, Glebe (AU); Qiang Yuan, Pendle Hill (AU)

(73) Assignee: Advanced Composite Structure Australia Party Ltd, Victoria (AU)

(*) Notice: Subject to any disclaimer, the term of this patent is extended or adjusted under 35 U.S.C. 154(b) by 61 days.

This patent is subject to a terminal disclaimer.

(21) Appl. No.: 12/319,601

(22) Filed: Jan. 9, 2009

(65) Prior Publication Data
US 2009/0246548 A1 Oct. 1, 2009

Related U.S. Application Data

(63) Continuation of application No. 10/485,449, filed as application No. PCT/AU02/01014 on Jul. 31, 2002, now abandoned.

(30) Foreign Application Priority Data

Jul. 31, 2001 (AU) .................................. PR6731

(51) Int. Cl.
*B32B 37/00* (2006.01)
*C08J 5/12* (2006.01)

(52) U.S. Cl.
CPC ........................................ *C08J 5/12* (2013.01)
USPC .................................... 156/307.1; 156/308.2

(58) Field of Classification Search
USPC .......... 156/307.1, 307.3, 308.2, 309.6, 307.7; 428/174

See application file for complete search history.

(56) References Cited

U.S. PATENT DOCUMENTS

| 2,961,363 A | 11/1960 | Lowes |
| 4,121,963 A | 10/1978 | Yardley et al. |
| 4,443,507 A | 4/1984 | Yamada et al. |
| 4,744,846 A | 5/1988 | Pflug et al. |

(Continued)

FOREIGN PATENT DOCUMENTS

| EP | 0142930 A2 | 5/1985 |
| EP | 0156536 B1 | 7/1990 |

(Continued)

OTHER PUBLICATIONS

Kelleher "1.3 Semicrystalline Thermoplastics" pp. 4 and 5 1993.*

(Continued)

*Primary Examiner* — John Goff
(74) *Attorney, Agent, or Firm* — Andrus Intellectual Property Law, LLP (57) ABSTRACT

A process for bonding a semi-crystalline or crystalline thermoplastic polymer to a thermosetting polymer component, the process including selecting compatible semi-crystalline thermoplastic polymer and uncured thermosetting polymer components wherein the curing temperature of the uncured thermosetting polymer components is above the melting temperature of the semi-crystalline thermoplastic polymer. The process includes locating the thermoplastic polymer in contact with the uncured thermosetting polymer component and heating the thermoplastic polymer and uncured thermosetting polymer or thermosetting polymer composite component to the curing temperature of the thermosetting polymer components and the thermoplastic polymer are able to at least partly interpenetrate before the thermosetting polymer cures. The thermoplastic polymer and cured thermosetting polymer component are then cooled such that the thermoplastic polymer is very strongly bonded to the cured thermosetting polymer component.

20 Claims, 2 Drawing Sheets

(56) References Cited

U.S. PATENT DOCUMENTS

| | | | |
|---|---|---|---|
| 4,744,849 | A | 5/1988 | Michaud-Soret |
| 4,956,224 | A | 9/1990 | Leca |
| 5,569,430 | A | 10/1996 | Callaway et al. |
| 5,643,390 | A | 7/1997 | Don et al. |
| 5,667,881 | A | 9/1997 | Rasmussen et al. |
| 5,921,587 | A | 7/1999 | Lueghamer |
| 6,056,844 | A | 5/2000 | Guiles et al. |
| 6,447,880 | B1 | 9/2002 | Coppens |
| 8,197,624 | B2 * | 6/2012 | Beehag et al. ............ 156/73.1 |

FOREIGN PATENT DOCUMENTS

| | | | |
|---|---|---|---|
| EP | 0643248 | A1 | 3/1995 |
| FR | 2334498 | A1 | 7/1977 |
| GB | 2130158 | A | 5/1984 |
| GB | 2286148 | A | 9/1995 |
| JP | 54-38376 | | 3/1979 |
| JP | 54038376 | A | 3/1979 |
| JP | 03180309 | A * | 8/1991 |

OTHER PUBLICATIONS

Accu Dyne Test "Critical Surface Tension, Surface Free Energy, Contact Angles with Water, and Hansen Solubility Parameters for Various Polymers" pp. 1-8 date unknown.*
Plastic Design Library "Epoxy Adhesives" pp. 144 and 145 1997.*
Table A.2 from "Hansen Solubility Parameters" 2000.*
Abstract for JP 54-38376, Mitsubishi Rayon Co. Ltd., Mar. 22, 1979.
Ageorges C. et al.; "Advances in fusion boding techniques for joining thermoplastic matrix composites: a review" Compsoties Part A: Applied Science and Manufacturing, Elsevier Science Publishers B.V., Amsterdam, NL, vol. 32, No. 6, Jun. 1, 2000.
Derwent Abstract for FR 2334498, Accession No. 69306Y/39, Class A32, "Moulding Resin Impregnated Foam and Fibrous Sheets Laminate—Using Thermoplastic Protection Sheet to Improve Moulding Surface," Aciers et Outillage Peugeot, 1975.
Meakin P.J.: "Thermaoplastic interlayer bonding of aromatic polymer composites methods for using semi-crystallized polymers" Composits manufacturing, Butterworth Scientific, Guildford, Surrey, GB, vol. 2, No. 2, 1991, pp. 86-91, XP000265395 ISSN: 0956-7143 p. 89.
Xi, B. et al., "The Mechanism of PTC Effect in Polyethylene/Carbon Black Composite," pp. 995-1998, 1999.
Sperling, L.H.; "Glass-Rubber Transition Behavior"; Introduction to Physical Polymer Science; 2nd Edition; pp. 360-361; 1932.
Mascia L.; Thermoplastics: Materials Engineering; 2nd Edition; pp. 12-13; 1940.
Mascia, L.; Thermoplastics: Materials Engineering; 2nd Edition; Table 2.2; 1940.
Sperling L.H.; "The Amorphous State"; Introduction to Physical Polymer Science; pp. 186-187; 1932.
Tess et al.; Applied Polymer Science; pp. 406-407; 1915.
Selleys Araldite Super Strength website; http://www.selleys.com.au/Selleys-Araldite-Super-Strength/default.aspx.
Brown, Hugh R.; U.S. Appl. No. 10/485,449; Declaration: Dec. 16, 2007.
Barton, Allan F.M.; CRC Handbook of Solubility Parameters and Other Cohesion Parameters; pp. 58-61, 139-165; 1983.
Coppens; "Service Temp Above Tg VP" (Table); CRC for Advanced Composite Structures Confidential.
1 Solubility Parameters—An Introduction, 2000, CRC Press, LLC.
Appendix for Soluibility Parameters, 2000, CRC Press, LLC.
Crane et al., "Selection and Use of Engineering Materials", available at least 1997, p. 60, Butterworth-Heinemann.
Ebewele, "Polymer Science and Technology", 2000, p. 433-434, Chapman & Hall/CRC CRC PRess, LLC.
Groover, Mikell P., "Fundamentals of Modern Manufacturing: Materials, Processes, and Systems", 4th Ed., 2010, p. 166-167.
Peng, et al., "Relationship Between Hansen Solubility Parameters of ABS and its Homopolymer Components of PAN, PB, and PS", Journal of Macromolecular Science, Part B, 2010, 49(5); 864-869.

* cited by examiner

WELDING TECHNIQUES FOR POLYMER OR POLYMER COMPOSITE COMPONENTS

CROSS-REFERENCE TO RELATED APPLICATIONS

This application is a continuation of U.S. patent application Ser. No. 10/485,449 filed on Jan. 29, 2004, now abandoned, entitled "Welding Techniques for Polymer or Polymer Composite Components" and claims priority from International Patent Application PCT/AU02/01014, entitled "Welding techniques for polymer or polymer composite components" filed Jul. 31, 2002 which claims priority from Australian Patent Application PR6731 entitled "Welding techniques for polymer or polymer composite components," filed Jul. 31, 2001, the contents of which are incorporated by reference herein in its entirety.

FIELD OF THE INVENTION

The present invention relates to the creation of a new functional surface on a polymer or polymer composite component. In particular, the invention relates to altering the surface of a thermosetting polymer or thermosetting polymer composite. The invention also relates to a method for the formation of a joint between a thermosetting polymer or thermosetting polymer composite component, having a modified functional surface, and a second component.

BACKGROUND OF THE INVENTION

Thermoplastic polymers (thermoplastics) are one of the major classes of polymer material. A solid thermoplastic polymer can typically be heated to soften and ultimately melt it, and then cooled to return it to its solid state. These temperature-induced changes are mostly fully-reversible. Thermoplastics can be divided into two broad groups: "amorphous thermoplastics" and "semi-crystalline thermoplastics". In solid amorphous thermoplastics all of the polymer chains are arranged in a random or disordered state: none of the polymer chains are arranged in a crystalline structure. In solid semi-crystalline thermoplastics the structure is mixed: in some portions of the material the polymer chains are arranged in a ordered crystalline structure, and in some portions the chains are in an amorphous state. "Crystalline thermoplastics" have a higher proportion of crystallinity, but still have some amorphous portions. For the purpose of this discussion, crystalline thermoplastics will be grouped with semi-crystalline thermoplastics, and the term "semi-crystalline thermoplastic" will also include "crystalline thermoplastic". In addition for the purpose of this discussion, "amorphous polymers" or "amorphous thermoplastics" and "semi-crystalline polymers" or "semi-crystalline thermoplastics" refer to types of thermoplastic polymer material, rather than to the local microstructure of any portion of thermoplastic polymer material.

Amorphous thermoplastics are characterised by a glass transition temperature ($T_g$) above which, with further heating, progressive softening occurs. At temperatures substantially higher than the glass transition temperature these thermoplastics behave like a high viscosity liquid. The service temperature of amorphous thermoplastics is below their glass transition temperature. They are also as a class generally susceptible to chemical attack and fluid absorption.

Semi-crystalline thermoplastics have a distinctive melting temperature ($T_m$), above which the material melts and behaves as a liquid. With further increases in temperature the viscosity falls off quickly. Semi-crystalline thermoplastics also have a characteristic glass transition temperature, often well below the melting temperature, due to their amorphous portions. Whether the semi-crystalline thermoplastic is above or below its glass transition temperature also influences some properties of these thermoplastics. However semicrystalline thermoplastics can often be used at service temperatures well above their glass transition temperature, because their crystalline portions are very rigid. Typically, semi-crystalline thermoplastics absorb less fluid than amorphous materials.

In both amorphous thermoplastics and semi-crystalline thermoplastics, changes induced by heating or cooling are normally fully reversible, unless the decomposition temperature, typically much higher than either the glass transition temperature or the melting temperature, is exceeded.

Thermosetting polymers are a second class of polymer that includes epoxide (often called epoxy), bismaleimide and vinyl ester polymers. An addition-polymerisation thermosetting polymer such as epoxy prior to curing consists of (as a minimum) a resin (monomer) and a hardener, which react together to produce a cross-linked polymer. Prior to curing, the monomer and hardener are normally in a liquid form, although their viscosities may be very high. Curing may be designed to occur at room temperature or higher temperatures, typically up to 180° C. for epoxies. During curing the monomer and hardener react, and the viscosity of the mixture increases until it becomes a cross-linked solid polymer. This change is not reversible. After curing the thermosetting polymer also has a characteristic glass transition temperature (typically slightly greater than the recommended curing temperature for epoxies) above which considerable softening of the thermosetting polymer occurs, and the thermosetting polymer behaves like a rubber. (Further heating does not melt the polymer—instead it typically starts to decompose at higher temperatures.) This is critical for subsequent processing such as high-temperature joining of components that contain a thermosetting polymer (e.g. a carbon fibre/epoxy composite), as dimensional distortion of the components can occur when the glass transition temperature of the thermosetting polymer is approached or exceeded.

Composite materials are a class of material which consist of at least two constituent materials, intimately joined together, which together behave as one material with different, usually superior, properties to either of the constituent materials. Polymer composites consist of polymers, either thermosetting or thermoplastic, reinforced by fibre or particulate reinforcement. Well-known polymer composites include glass fibre reinforced polyester resin, and carbon fibre reinforced epoxy. Both these use thermosetting polymers as the matrix, and are therefore often called thermosetting composites.

One major difference between thermoplastic and thermosetting polymers is that thermoplastics can be melted and resolidified by raising and lowering temperature, whereas thermosetting polymers cannot. This characteristic has been utilised for the welding of thermoplastics and thermoplastic composites, whereas thermosetting polymers or thermosetting composites cannot be joined simply in this fashion.

Thermosetting polymer components with thermoplastic surfaces are attractive, some advantages being enabling the enhanced surface properties of the thermoplastic and potentially for welding of similarly surfaced components. Normally this would be done by an adhesive bonding process. In an adhesive bonding process, the adhesive is brought into contact with the component, must flow and wet the component, and is then solidified in situ. It is quite common to make an adhesive joint between a thermosetting polymer and a thermoplastic polymer. In the most common method an uncured thermosetting polymer such as an epoxy is used as the adhesive, brought into contact with a solid thermoplastic polymer, and subsequently cured. This could be done as part of the process to cure a thermosetting composite component. Alternatively, a thermoplastic polymer can be used as the adhesive, by heating it to melt it and bringing it into contact with a cured thermosetting component. The thermoplastic resin is subsequently cooled.

In both these situations, it is difficult to generate strong adhesive bonds between the thermosetting polymer and thermoplastic polymer. Where the thermoplastic is used as the adhesive, the joint relies on weak secondary chemical bonds and is therefore itself weak. Where an uncured thermosetting polymer functions as the adhesive, on a thermoplastic surface, there are generally few sites for the formation of the higher strength primary chemical bonds. These bonds can be encouraged by surface treatment of the thermoplastic, either with a chemical agent or by physical means such as plasma treatment. This can be time-consuming and expensive, may not provide sufficiently high strength or reliability for a critical application such as the assembly of aircraft components, and may still be subject to chemical attack.

However, a better method of achieving high strength attachment between thermosetting and thermoplastic polymers is by the formation of a semi-interpenetrating polymer network. These provide a form of mechanical interlock between the polymer chains of different polymers (in this case thermosetting and thermoplastic polymers) by having the chains of one polymer interpenetrating the other.

Previously, amorphous thermoplastic materials have been joined to thermosetting composites by formation of an interpenetrating polymer network during the curing of the thermosetting composite by encouraging the liquid, uncured components (monomer and hardener) of the thermosetting polymer to migrate into the amorphous thermoplastic before the thermosetting polymer cures, utilising the low solvent resistance of the amorphous thermoplastic. This migration into the amorphous thermoplastic would normally occur below the glass transition temperature of the thermoplastic, at which condition the material is solid. This effectively gives the cured thermosetting composite a thermoplastic surface, with the ability to join to a similarly-surfaced material under increased temperature and some joining pressure.

The above process, and the amorphous thermoplastic required for it, has several disadvantages. Firstly, the low solvent resistance required for the amorphous thermoplastic used in this process means that the surface and any joint formed from this surface is likely to be susceptible to solvent attack. Secondly, with this process there is an inherent difficulty in attempting to select materials which will allow easy and efficient surfacing and welding processes as well as provide a high service temperature in the subsequent welded joint. In order to join two components with amorphous thermoplastic surfaces, the glass transition temperature of the thermoplastic has to be substantially exceeded, possibly by at least 50° C., to obtain a high quality joint in a reasonable time. As a result, the glass transition temperature of the underlying thermosetting polymer is typically exceeded, which leads to reduced stiffness and dimensional instability of the component. Dimensional change of the components is likely, unless adequate tooling is used to support the component at the joining temperature, especially as high pressures may need to be applied to the joint in order to obtain good contact and sufficient flow for consistent high-quality joints. If a sufficiently high temperature is required for the joining process, degradation of the thermosetting polymer or thermosetting composite can also occur. If a high-temperature amorphous thermoplastic is chosen as the surfacing/welding material in order to boost the service temperature of the weld, the surfacing and welding processes must in general be conducted at higher temperatures, risking dimensional change or degradation of the thermosetting composite. If a lower-temperature amorphous thermoplastic is chosen for easy surfacing and welding, the service temperature is likely to be unacceptably low. Finally, joining to a high-temperature amorphous thermoplastic often requires special long and/or complex cure cycles, for example cure cycles including dwell times below the normal curing temperature, in order to have the thermosetting monomer and hardener penetrate to a depth sufficient for adhesive strength. This may add many hours to the manufacturing time of a component, resulting in increased costs of production.

U.S. Pat. No. 5,643,390 describes a process of bonding a thermoplastic layer to a thermoset composite. The described method involves "selecting a thermoplastic material and a thermosetting monomer wherein said thermosetting monomer has similar solubility parameters to that of said thermoplastic material". "Similar solubility parameters" is defined in terms of Hildebrand solubility theory, which is not suitable for the description of polymers with substantial polar and/or hydrogen bonding forces.

This US patent is directed to the use of amorphous thermoplastics. The patent advises that the mobility of penetrants in semi-crystalline polymers is extremely small, and this prevents the formation of an interpenetrating network to provide adhesive strength. There is also no discussion of the compatibility of semi-crystalline thermoplastic polymers.

In contrast, the present invention is a process which utilises semi-crystalline polymers, advantageously allowing easier surfacing and subsequent welding, and not compromising the solvent resistance of the subsequent welded joint.

U.S. Pat. No. 5,667,881 describes a method for fabricating an integral thermoset/thermoplastic composite joint. The described method requires that the thermoplastic and thermoset resins must be mutually partially miscible, or mutually miscible between 10 and 60%. The patent also states that the cure temperature does not significantly exceed the glass transition temperature of the thermoplastic resin. At such temperatures the thermoplastic polymer is solid or has an extremely high viscosity, and migration of the uncured thermoset polymer into an amorphous thermoplastic polymer, and formation of a semi-interpenetrating network is quite slow. This is confirmed by the long cure cycles mentioned in the patent.

Further, the invention described in U.S. Pat. No. 5,667,881 relates to the formation of an integral joint with a prefabricated thermoplastic article, which places constraints on the type of article that may be attached using this technique, when compared to the formation of a functional thermoplastic surface.

The present invention advantageously alleviates at least some of the disadvantages of the processes described above, and provides an improved process for forming a thermoplastic surface on a thermosetting polymer or thermosetting polymer composite.

A further advantage of the present invention is an improved process for joining a thermosetting polymer or thermosetting polymer composite component, having a thermoplastic surface, to a second component with a suitable thermoplastic surface.

SUMMARY OF THE INVENTION

In a first aspect, the invention provides a process for bonding a semi-crystalline or crystalline thermoplastic polymer to a thermosetting polymer component, the process including:

selecting compatible semi-crystalline thermoplastic polymer and uncured thermosetting polymer components wherein the curing temperature of the uncured thermosetting polymer component is above the melting temperature of the semi-crystalline thermoplastic polymer, locating the thermoplastic polymer in contact with the uncured thermosetting polymer component;

heating the thermoplastic polymer and uncured thermosetting polymer or thermosetting polymer composite component to the curing temperature of the thermosetting polymer, where the uncured thermosetting polymer components and the thermoplastic polymer are able to at least partly interpenetrate before the thermosetting polymer cures; and cooling the thermoplastic polymer and cured thermosetting polymer component such that the thermoplastic polymer is very strongly bonded to the cured thermosetting polymer component.

In a second aspect, the invention provides a process for bonding a semi-crystalline or crystalline thermoplastic polymer to a thermosetting polymer component, the process including:

selecting compatible semi-crystalline thermoplastic polymer and uncured thermosetting polymer components wherein the uncured thermosetting polymer components can migrate into the semi-crystalline thermoplastic polymer at or below the curing temperature of the thermosetting component;

locating the thermoplastic polymer in contact with the uncured thermosetting polymer component;

heating the thermoplastic polymer and uncured thermosetting polymer or thermosetting polymer composite component to the curing temperature of the thermosetting polymer, where the uncured thermosetting polymer components and the thermoplastic polymer are able to at least partly interpenetrate before the thermosetting polymer cures; and cooling the thermoplastic polymer and cured thermosetting polymer component such that the thermoplastic polymer is very strongly bonded to the cured thermosetting polymer component.

In the second aspect of the invention, the curing temperature of the thermosetting component may be below the melting temperature of the semi-crystalline thermoplastic polymer.

In either of the above embodiments of the invention, the thermosetting polymer component may be a thermosetting polymer or a thermosetting polymer composite. When the thermosetting polymer component is a composite, the thermoplastic polymer and the uncured thermosetting polymer part of the thermosetting polymer composite are able to, when heated, at least partly interpenetrate before the thermosetting polymer cures, thereby bonding the thermoplastic polymer to the thermosetting polymer composite.

The compatibility of the thermoplastic and thermosetting components indicates the ability of the thermoplastic and thermosetting components to interpenetrate through close matching of their respective solubilities.

Advantageously, the thermoplastic polymer may be a thermoplastic polymer component or a component of any sort with a compatible thermoplastic polymer surface.

It will be appreciated that, with the interpenetration between the thermoplastic and thermoset resins, the thermoplastic polymer surface is very strongly bonded to the thermosetting polymer or thermosetting polymer composite. This ensures that the thermoplastic surface cannot be readily removed from the thermosetting polymer or thermosetting polymer composite.

It will be appreciated that a cured thermosetting polymer or thermosetting polymer composite with a thermoplastic surface made according to the first or second aspect of the invention may be bonded to a further section of thermosetting polymer or thermosetting polymer composite by a second curing process conducted according to the first or second aspect of the invention.

Preferably, the thermoplastic polymer is polyvinylidene fluoride (PVDF), either pure PVDF or containing the PVDF in combination with other polymers and/or conventional additives.

Additionally, the thermoplastic polymer may contain a small amount of additional material, such as a lightweight fabric scrim. Alternatively, the thermoplastic polymer may contain a small amount of material allowing electrical conductivity or localised heating, such as ferromagnetic particles or other electrically conductive material.

The thermoplastic polymer may be in the form of a film or powder, or coated directly onto the surface of a mould or tool. Additional material, which does not adhere to the thermoplastic, may be located adjacent to the thermoplastic film during manufacture to improve the surface quality of thermoplastic after manufacturing.

The thickness of thermoplastic may be varied on the surface of the component.

The thermosetting polymer is preferably a resin/hardener mixture cured at an appropriate elevated temperature. In the case of a thermosetting polymer composite, the composite is a suitable thermosetting polymer reinforced with one or more other materials. More preferably the thermosetting polymer is an epoxy or a bismaleimide.

The third aspect of the invention takes advantage of the fact that the first or second aspect of the invention provides a cured thermosetting polymer or cured thermosetting polymer composite with a semi-crystalline or crystalline thermoplastic surface.

Accordingly, the third aspect of the invention provides a process for joining a thermosetting polymer or thermosetting polymer composite component with a thermoplastic surface made in accordance with the first or second aspect of the invention, to a second component having a thermoplastic surface, the process including:

locating and holding the thermoplastic surface of the thermosetting polymer component or thermosetting polymer composite in intimate contact with the thermoplastic surface of the second component;

heating the respective thermoplastic surfaces to a temperature above the melting temperature of the thermoplastics for a time such that the thermoplastic surfaces become molten and welding of the adjacent thermoplastic surfaces occurs; and cooling the molten thermoplastic to produce a strong bond between the thermosetting or thermosetting composite components and the second component.

Advantageously, the thermoplastic surface of the thermosetting polymer composite component is formed in accordance with either the first or second aspects of the invention.

The thermosetting polymer component may be a thermosetting polymer or a thermosetting polymer composite.

Preferably, the second component is a thermosetting polymer or thermosetting polymer composite component having a thermoplastic surface such that the process of the third aspect of the invention may be used to form a joint between two thermosetting polymers or thermosetting composite components with thermoplastic surfaces.

Alternatively, the second component may be a thermoplastic polymer or thermoplastic polymer composite, or any other component having a suitable thermoplastic surface.

The molten thermoplastic surfaces provide high thermoplastic polymer flow when placed in intimate contact, thereby filling any undulations in the opposed surfaces. The flow can be increased by raising the temperature and/or applying more pressure to the two components during heating or allowing additional process time.

The process may further include adding further layers of semi-crystalline or crystalline thermoplastic material between the thermoplastic surfaces as required to fill gaps or provide high thermoplastic polymer flow. Where additional thermoplastic material is used, the step of heating also includes heating the additional thermoplastics material to a temperature above the melting temperature of the thermoplastic for a time such that the thermoplastic layers become molten and fuse together.

Reheating the welded thermoplastic layers also allows for the components to be dismantled and reassembled as required. They may then be welded again in the same manner described above, with extra thermoplastic material added between the modified thermoplastic surfaces if insufficient thermoplastic material has been retained on the separated components.

Reheating the welded thermoplastic layers also allows for the components to be put through the welding process again, or rewelded, to improve the weld in selected areas.

Preferably, welding takes place at a temperature below the glass transition temperature of the cured thermosetting polymer or polymer composite component. Alternatively welding takes place at a temperature not significantly overheating the thermosetting polymer.

The thermosetting composite components may include inserts, foam or honeycomb core, other thermoplastic sub-components or films, or any other material that can be incorporated as an integral part of a largely thermoset composite component.

The invention also extends to thermosetting components having a thermoplastic surface made in accordance with either the first or second aspects of the invention. Advantageously, the preferred features of the process of the first and second aspects of the invention apply, as appropriate, to the component formed from the process.

The invention further extends to products made in accordance with the third aspect of the invention. Advantageously, the preferred features of the process of the third aspect of the invention apply, as appropriate, to the products formed from the process.

BRIEF DESCRIPTION OF THE DRAWINGS

The invention will now be described, by way of example only, with reference to the accompanying drawings in which.

DESCRIPTION OF PREFERRED EMBODIMENTS

Figure 1:
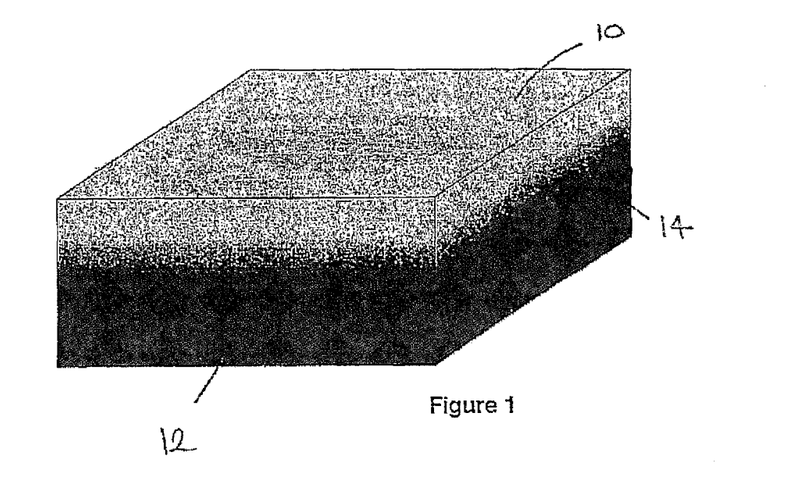
FIG. 1 illustrates the relationship of a reinforced thermosetting polymer, a thermoplastic layer, and the semi-interpenetrating network (SIPN) formed therebetween.

In a first embodiment of the invention, and with reference to FIG. 1, a semi-crystalline or crystalline thermoplastic layer 10 is bonded to the surface of a thermosetting polymer 12 or thermosetting composite component during the curing of the thermosetting component to form a semi-interpenetrating polymer network 14. This is achieved by selecting a semi-crystalline thermoplastic 10 which is compatible with the chosen thermosetting monomers. Determination of suitable material combinations can be made using thermodynamic and solubility criteria, which will be discussed in the following section.

Polymer Thermodynamics and Solubility Criteria

The selection of compatible materials requires a close matching of several solubility parameters. The principle of material selection for a compatible amorphous thermoplastic is based on the Gibb's free energy of mixing ($\Delta G_m$), which states that $$\Delta G_m = \Delta H_m - T \Delta S_m \leq 0 \quad (1)$$

where $\Delta H_m$ is enthalpy of mixing, T is temperature and $\Delta S_m$ is entropy of mixing. The Hildebrand-Scatchard equation can then be used to determine the enthalpy of mixing as $$\Delta H_m = V \Phi_a \Phi_b (\delta_a - \delta_b)^2 \quad (2)$$

where $\delta_a$ and $\delta_b$ are the solubility parameters (also known as the Hildebrand parameters) of the two species considered, e.g. amorphous polymer and monomer or hardener.

Figure 4:
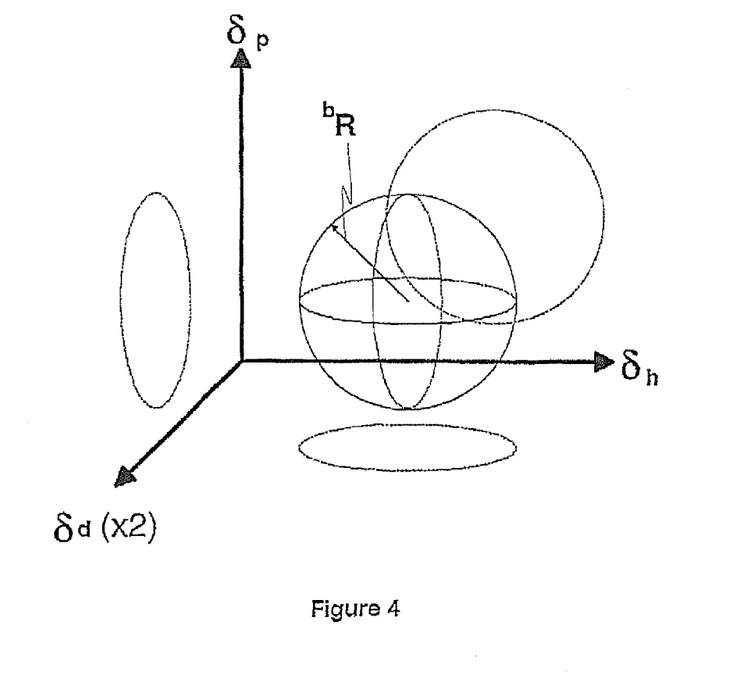
FIG. 4 illustrates a Hansen solubility diagram for a polymer, which can be used determine the suitability of a solvent for a particular polymer.

However, the use of the Hildebrand-Scatchard equation (Equation (2) above) is inadequate for the class of high-performance semi-crystalline thermoplastics that would be most favourable for joining applications, as intermolecular forces such as polar forces greatly affect the solubility behaviour of these polymers. The use of Hansen parameters which take account of dispersion, polar and hydrogen bonding forces is recommended as a more suitable approach for these polymers (See AFM Barton "CRC Handbook of Solubility Parameters and Other Cohesion Parameters", CRC Press, Boca Raton, 1983). The application of these parameters provides a reasonable guide for polymer-solvent compatibility. A radius of compatibility for polymer b is defined by radius $^bR$, as shown in the solubility chart in FIG. 4. The Hansen solubility parameters for dispersion ($\delta_d$), polar ($\delta_p$) and hydrogen bonding forces ($\delta_h$) for any solvent a can be determined and plotted on the chart. Where the point on the solubility chart locating the three Hansen parameters for solvent a ($^a\delta_d$, $^a\delta_d$, and $^a\delta_d$) lies within the sphere defined by $^bR$, the polymer is soluble in the solvent, i.e.

$$[4(^a\delta_d - ^b\delta_d)^2 + (^a\delta_p - ^b\delta_p)^2 + (^a\delta_h - ^b\delta_h)^2]^{1/2} < ^bR \quad (3)$$

where the solvent in this case is the monomer or hardener, and $^bR$ is determined by standard experiments using common solvents of known Hansen parameters.

An advantageous feature of the first and second aspects of the current invention is the alteration of the "effective solubility parameter" of the semi-crystalline thermoplastic 10. This is achieved by bringing the thermoplastic 10 and monomer/hardener 12 to a sufficiently high temperature. In general terms, solvents cannot migrate effectively through the solid crystalline portion of polymers, due to insufficient free energy to overcome the heat of fusion of the crystalline portion of the polymer. Through increased temperature of the system, the heat of fusion is overcome. Under these circumstances the monomer and hardener are able to migrate through the polymer, whereas previously the polymer was insoluble. Hence the "effective solubility parameter" of the polymer is altered through the addition of heat.

Therefore one way to provide for rapid formation of a semi-interpenetrating polymer network 14 is to alter the "effective solubility parameter" of the semi-crystalline thermoplastic 10 by curing the thermosetting polymer 12 above the melting temperature of the semi-crystalline thermoplastic 10. However, a second possibility also exists, as described in relation to the second aspect of the invention. Through careful matching of the monomer/hardener 12 and thermoplastic solubility properties, and at a suitable temperature, the presence of the thermoset monomer, acting as a solvent, can overcome the heat of fusion of the crystalline polymer, thus lowering the "melt" temperature to an "effective melting temperature" which depends on the monomer/hardener involved. Under these circumstances the monomer and hardener are able to migrate through the polymer below the normal melting temperature. This is demonstrated in the experimental discussion within this document.

It should be noted that the melting temperature or lower "effective melting temperature" described here would be a minimum processing temperature, and that standard curing conditions for the thermosetting polymer may impose a higher processing temperature.

Material Selection and Surface Integration

A semi-crystalline thermoplastic material 10 selected according to the above criteria may be integrated successfully, by the formation of a substantial semi-interpenetrating polymer network (SIPN) 14, onto the surface of a thermosetting polymer or thermosetting polymer composite 12. An aspect of that process is the selection of a thermosetting polymer and a thermoplastic with a solubility determined by the use of Hansen parameters, and the selection of a curing temperature/time cycle such that the thermosetting monomer and hardener are able to migrate sufficiently into the molten semi-crystalline polymer, or into the crystalline component of the thermoplastic polymer by overcoming the heat of fusion of the crystalline component.

During processing the crystalline portion of the thermoplastic polymer in contact with the monomer and hardener "melts", allowing rapid discrete mixing of the uncured thermosetting resin and thermoplastic resin. Following cure of the component, the thermoplastic film 10 is intimately bonded to the component 12 through the entanglement of molecular chains in the region of the original surfaces thereby forming a semi-interpenetrating polymer network 14 between the thermosetting resin and the thermoplastic resin.

Advantageously, when the above thermodynamic and solubility compatibility criteria have been met, the bonding process may typically take place without any alteration to the manufacturer's recommended curing cycle for the thermosetting polymer.

Figure 2:
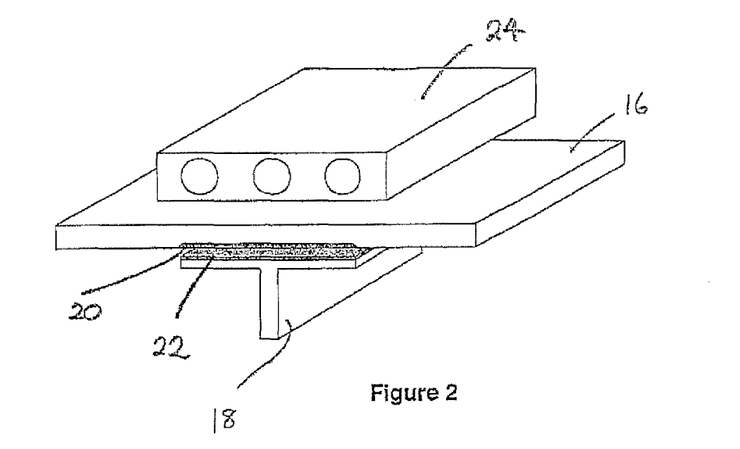
FIG. 2 is a schematic illustration showing the joining of two thermosetting polymer components according to an embodiment of the present invention.
Figure 3:
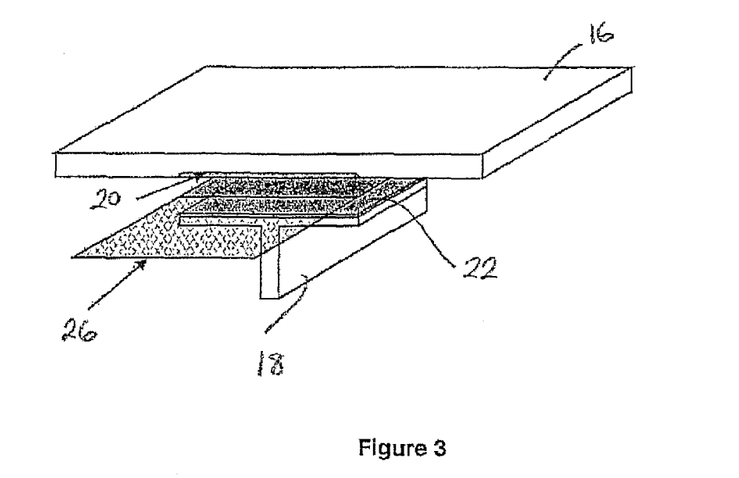
FIG. 3 is a schematic illustration showing the joining of two thermosetting polymer components according to an embodiment of the present invention.

Further selection criteria may also be applied for the benefit of the subsequent process of welding thermosetting polymer or thermosetting polymer composites 16, 18, whereby the melting point of the semi-crystalline thermoplastic polymer $(T_m)$ 20 is below the glass transition temperature $(T_g)$ of the cured thermosetting polymer or thermosetting polymer composite 16, 18. The discussion below is directed to this circumstance, but it will be appreciated that the invention is not restricted to this material selection, but rather that additional advantages would result from such an appropriate selection.

Welding Technology

The above thermodynamic discussion relates to the selection of a semi-crystalline thermoplastic for integration of thermoplastic material onto the surface of a thermosetting polymer or thermosetting polymer composite. The selection of a semi-crystalline thermoplastic material with a melting temperature below the $T_g$ of the cured thermosetting polymer or polymer composite component, as in the first aspect of the invention, allows distinct advantages in the welding of two largely thermosetting composite components.

In accordance with a third embodiment of the invention, a thermosetting polymer or thermosetting composite component 16 with a semi-crystalline thermoplastic surface 20 formed in accordance with the first or second aspect of the invention may be joined to a second component 18 having a suitable thermoplastic surface 22, under external heat and pressure (heat platen 24), as illustrated in FIG. 2. Alternatively, a heating element 26 as shown schematically in FIG. 3, or other material allowing heat to be focused on the welding line, can be used to join two components 16, 18.

The second component may also be a thermosetting polymer or thermosetting composite component with a semi-crystalline thermoplastic surface, and the discussion below is directed to this circumstance, but it will be appreciated that the third embodiment of the invention is not so restricted and extends broadly to the formation of a joint between a thermosetting polymer or thermosetting composite component with a semi-crystalline thermoplastic surface formed in accordance with the first or second of aspect of the invention and any other component with a suitable thermoplastic surface.

The inclusion of a thermoplastic polymer surface of a thermosetting polymer or thermosetting composite component enables joining of two components made largely of different thermosetting polymers or thermosetting polymer composites or other materials but with similar surface materials.

The process of welding the thermoplastic layers takes place under applied heat and, in most circumstances, pressure. The thermoplastic layers are heated to a temperature above the melting temperature of the thermoplastic and below the glass transition temperature of the thermosetting polymer or thermosetting composite components. When the thermoplastic has a melting temperature lower than the glass transition temperature of the thermosetting components that are to be joined, the components may in the right circumstances be joined without the use of supporting tooling, with no permanent distortion of the components occurring during joining. Furthermore degradation of the thermosetting polymer or composite is unlikely when exposed to a temperature below the glass transition temperature of the thermosetting polymer for a moderate period of time. This reduces or eliminates the need for expensive or sophisticated systems to focus heating on the joint only.

Further, since the welding process occurs above the melt temperature of the semi-crystalline or crystalline thermoplastic, the thermoplastic flows considerably during welding, even under very low welding pressures. This degree of flow above their melt temperature is an intrinsic advantage of semi-crystalline thermoplastic polymers in this application. Such flow allows the thermoplastic to fill small undulations in the surface of the components or small gaps between the components due to normal manufacturing tolerances, and is very important for a practical welding process. This reduces the cost of tooling for such operations and reduces the possibility that the largely thermoset composite components will become distorted during the process.

The invention also allows simple unwelding and separation of any welded components. The components, or the welded region thereof, can be heated to a temperature above the melt temperature of the semi-crystalline or crystalline thermoplastic. An advantage of the current invention is that the thermosetting polymer or thermosetting composite components can be separated with external heat applied near the joint, and there is no requirement for an embedded element. At this temperature range little force is needed to separate the components. As each component will retain most of its thermoplastic surface layer, due to the formation in the surfacing process of a semi-interpenetrating polymer network, the separated components may subsequently be welded again in the same manner described above. If necessary, an extra layer or layers of semi-crystalline or crystalline thermoplastic material may be added between the modified thermoplastic surfaces if insufficient thermoplastic material has been retained on the separated components.

Alternatively, if desired, at this temperature range the components may be put through the welding process again, or rewelded, to improve the weld in selected areas.

While the majority of the above description relates to the surfacing of thermosetting composites with semi-crystalline or crystalline thermoplastic film for the purpose of subsequently joining thermosetting components, the generation of a thermoplastic functional semi-crystalline polymer surface intimately bonded to a thermosetting polymer or composite component may also provide additional distinct advantages such as improved chemical resistance, reduced water absorption, improved wear and erosion resistance, improved surface appearance, improved frictional properties, improved surface electrical properties, improved fire resistance or reduced smoke generation due to fire, improved UV resistance, improved surface cracking resistance, improved biocompatibility, improved ability to be sterilised or reduced notch sensitivity. In particular, the process of the first or second aspect of this invention may be used to provide strongly bonded erosion resistant surfaces for carbon fibre/epoxy composites.

It will also be appreciated that, the present invention provides an opportunity for the integration of a semi-crystalline polymer on the surface of a thermoplastic or thermoplastic composite based on a different thermoplastic polymer. In this circumstance, the provision of different surface properties or the ability to join components under different welding conditions to that required for the thermoplastic parent material would be enabled through this technique. Furthermore this technique would allow a class of thermoplastic or thermoplastic composite materials to be joined to thermosetting or thermosetting composite materials having a semi-crystalline polymer surface as discussed above.

Experimental Discussion
Surfacing Process

Two separate composite panels with a semi-crystalline polymer surface were manufactured. First, a single layer of PVDF semi-crystalline thermoplastic film with a melting point of approximately 170° C. (127 µm thickness) was placed on a stack of preimpregnated plain woven fabric comprising T300 carbon fibre and Hexcel F593 epoxy resin. The film was cleaned with isopropyl alcohol prior to placing on the stack. The stack was placed on a flat tool, and enclosed within a vacuum bag. The air within the vacuum bag was evacuated, and the stack subsequently cured at 177° C. and 0.63 MPa external pressure for 120 minutes. After curing, the thermoplastic layer was fully integrated with the composite substrate. A second panel was manufactured with a single 127 µm layer of PVDF semi-crystalline thermoplastic film placed on a stack of preimpregnated satin fabric consisting of glass fibre and Hexcel F155. The film was cleaned with isopropyl alcohol prior to placing on the stack. The stack was placed on a flat tool, and enclosed within a vacuum bag. The air within the vacuum bag was evacuated, and the stack subsequently cured at 127° C. and 0.32 MPa external pressure for 120 minutes. After curing the thermoplastic surface layer was fully integrated with the composite substrate.

Joining Process

Two composite components with identical thermosetting composite substrates and thermoplastic surfaces were cleaned with isopropyl alcohol and the thermoplastic surfaces placed in contact with each other. The T300/F593 and GF/F155 epoxy composites had bondlines heated to 185° C. and applied pressure of 0.1 Mpa for 20 minutes. Upon holding the components at the required temperature and pressure, whereby complete healing has occurred, the components were cooled while pressure was maintained. Upon cooling to room temperature, the components were welded together.

Bond Strength

Bond strengths were determined using a single-lap-shear bonding test specimen, with a width of 25 mm and joint length of 12.5 mm. Specimens were tested at ambient conditions at a speed of 1.25 mm/min. An average bond strength of 29.1 MPa was observed for the T300/F593 epoxy composite. This compares to an average bond strength of 24.4 MPa observed for otherwise identical specimens bonded using epoxy adhesive film. Additionally, an average bond strength of 27.6 MPa was observed for the glass fibre/F155 epoxy composite.

Pressure Requirements

Trials using various welding pressures indicate that high-quality welds can be made using pressures from 50 kPa to 1 MPa. A preferred pressure is between 100 kPa and 350 kPa. However, the applied pressure is not necessary for ensuring welding, but rather is used to bring the adjacent thermoplastic polymer surfaces into full and intimate contact, and to ensure some polymer flow. In manufacturing practice, minor fluctuations in dimensional tolerance are overcome by the use of pressure. In the case of this thermoplastic joining, no additional pressure is required other than to bring the surfaces into contact with each other, which allows the polymer chains to migrate across the original surface and thereby heal the joint. Higher pressures (1 MPa and greater) may also be used to force entrapped air from the joint. It should be noted that welding pressure may squeeze some of the thermoplastic out of the immediate joint area.

Joining Time

The ability of the polymer to heal itself, and the time taken to do so, where molecular chains cross the original join line and become entangled with the polymer chains from the adjacent surface, is dependent on the temperature of the thermoplastic surface, i.e. the activity level of the polymer chains.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A process for bonding a semi-crystalline thermoplastic polymer to a thermosetting polymer component, the process including:
   selecting compatible semi-crystalline thermoplastic polymer and uncured thermosetting polymer component wherein the curing temperature of the uncured thermosetting polymer component is above the melting temperature of the semi-crystalline thermoplastic polymer,
   locating the thermoplastic polymer in contact with the uncured thermosetting polymer component;

wherein the semi-crystalline thermoplastic polymer and uncured thermosetting polymer components have Hansen solubility parameters indicative of the thermoplastic polymer and thermosetting components ability to interpenetrate;

heating the semi-crystalline thermoplastic polymer and uncured thermosetting polymer component, wherein the component is a thermosetting polymer or thermosetting polymer composite, to the curing temperature of the thermosetting polymer component, where the uncured thermosetting polymer component and the thermoplastic polymer are able to at least partly interpenetrate before the thermosetting polymer cures; and cooling the thermoplastic polymer and cured thermosetting polymer component such that the thermoplastic polymer is very strongly bonded to the cured thermosetting polymer component.

2. A process according to claim 1, wherein the thermosetting polymer component is a thermosetting polymer.

3. A process according to claim 1, wherein the thermosetting polymer component is initially uncured and forms part of a thermosetting polymer composite.

4. A process according to claim 3, wherein the thermoplastic polymer and the uncured thermosetting polymer part of the thermosetting polymer composite are able to, when heated, at least partly interpenetrate before the thermosetting polymer cures, thereby bonding the thermoplastic polymer to the thermosetting polymer composite.

5. A process for bonding a semi-crystalline thermoplastic polymer to a thermosetting polymer component, the process including:

selecting compatible semi-crystalline thermoplastic polymer and uncured thermosetting polymer component wherein the uncured thermosetting polymer component can migrate into the semi-crystalline thermoplastic polymer at or below the curing temperature of the thermosetting component;

wherein the semi-crystalline thermoplastic polymer and uncured thermosetting polymer components have Hansen solubility parameters indicative of the thermoplastic polymer and thermosetting component's ability to interpenetrate;

locating the thermoplastic polymer in contact with the uncured thermosetting polymer component;

heating the thermoplastic polymer and uncured thermosetting polymer component, Wherein the component is a thermosetting polymer or thermosetting polymer composite, to the curing temperature of the thermosetting polymer component, where the uncured thermosetting polymer component and the thermoplastic polymer are able to at least partly interpenetrate before the thermosetting polymer cures; and cooling the thermoplastic polymer and cured thermosetting polymer component such that the thermoplastic polymer is very strongly bonded to the cured thermosetting polymer component.

6. A process according to claim 5, wherein the curing temperature of the thermosetting component is below the melting temperature of the semi-crystalline thermoplastic polymer.

7. A process according to claim 5, wherein the thermosetting polymer component is a thermosetting polymer.

8. A process according to claim 5, wherein the thermosetting polymer component is initially uncured and forms part of a thermosetting polymer composite.

9. A process according to claim 8, wherein the thermoplastic polymer and the uncured thermosetting polymer part of the thermosetting polymer composite are able to, when heated, at least partly interpenetrate before the thermosetting polymer cures, thereby bonding the thermoplastic polymer to the thermosetting polymer composite.

10. A process according to claim 1 or 5, wherein the thermoplastic polymer is a thermoplastic polymer component or a component with a compatible thermoplastic polymer surface.

11. A process according to claim 1 or 5, wherein the thermoplastic polymer is one of either pure polyvinylidene fluoride (PVDF), or a thermoplastic polymer containing PVDF in combination with other polymers and/or additives.

12. A process according to claim 1 or 5, wherein the thermoplastic polymer contains a small amount a lightweight fabric scrim.

13. A process according to claim 1 or 5, wherein the thermoplastic polymer contains material allowing electrical conductivity or localised heating, such as ferromagnetic particles or other electrically conductive material.

14. A process according to claim 1 or 5, wherein the thermoplastic polymer is in the form of a film or powder, or is coated directly onto the surface of a mould or tool.

15. A process according to claim 1 or 5, wherein the thermosetting polymer is a resin/hardener mixture cured at an elevated temperature.

16. A process according, to claim 1 or 5, wherein the thermosetting polymer is an epoxy or a bismaleimide.

17. A process for welding a thermosetting polymer or thermosetting polymer composite component with a thermoplastic surface to a second component having a thermoplastic surface, the process including:

locating and holding the thermoplastic surface of the thermosetting polymer component or thermosetting polymer composite in intimate contact with the thermoplastic surface of the second component;

heating the respective thermoplastic surfaces to a temperature above the melting temperature of the thermoplastics for a time such that the thermoplastic surfaces become moltin and welding of the adjacent thermoplastic surfaces occurs; and cooling the molten thermoplastic to produce a strong bond between the thermosetting or thermosetting composite components and the second component;

wherein the thermoplastic surface of the thermosetting polymer composite component is formed in accordance with claim 1.

18. A process for welding a thermosetting polymer or thermosetting polymer composite component with a thermoplastic surface to a second component having a thermoplastic surface, the process including:

locating and holding the thermoplastic surface of the thermosetting polymer component or thermosetting polymer composite in intimate contact with the thermoplastic surface of the second component;

heating the respective thermoplastic surfaces to a temperature above the melting temperature of the thermoplastics for a time such that the thermoplastic surfaces become moltin and welding of the adjacent thermoplastic surfaces occurs; and cooling the molten thermoplastic to produce a strong bond between the thermosetting or thermosetting composite components and the second component;

wherein the thermoplastic surface of the thermosetting polymer composite component is formed in accordance with claim 5.

19. A process for welding a thermosetting polymer or thermosetting polymer composite component with a thermoplastic surface to a second component having a thermoplastic surface, the process including:
　locating and holding the thermoplastic surface of the thermosetting polymer component or thermosetting polymer composite in intimate contact with the thermoplastic surface of the second component;
　heating the respective thermoplastic surfaces to a temperature above the melting temperature of the thermoplastics for a time such that the thermoplastic surfaces become moltin and welding of the adjacent thermoplastic surfaces occurs; and
　cooling the molten thermoplastic to produce a strong bond between the thermosetting or thermosetting composite components and the second component;
　wherein the second component is formed in accordance with claim 1.

20. A process for welding a thermosetting polymer or thermosetting polymer composite component with a thermoplastic surface to a second component having a thermoplastic surface, the process including:
　locating and holding the thermoplastic surface of the thermosetting polymer component or thermosetting polymer composite in intimate contact with the thermoplastic surface of the second component;
　heating the respective thermoplastic surfaces to a temperature above the melting temperature of the thermoplastics for a time such that the thermoplastic surfaces become moltin and welding of the adjacent thermoplastic surfaces occurs; and
　cooling the molten thermoplastic to produce a strong bond between the thermosetting or thermosetting composite components and the second component;
　wherein the second component is formed in accordance with claim 5.

\* \* \* \* \*